United States Patent
Niculae et al.

(10) Patent No.: US 8,049,471 B2
(45) Date of Patent: Nov. 1, 2011

(54) SYSTEM, METHOD AND APPARATUS TO AUTOMATICALLY DETECT A TYPE OF A VARIABLE OUTPUT DC POWER SOURCE

(75) Inventors: Marian Niculae, San Jose, CA (US); Constantin Bucur, Santa Clara, CA (US); William L. Densham, Los Gatos, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

(21) Appl. No.: 12/857,661

(22) Filed: Aug. 17, 2010

(65) Prior Publication Data

US 2010/0308779 A1 Dec. 9, 2010

Related U.S. Application Data

(63) Continuation of application No. 11/113,532, filed on Apr. 25, 2005, now Pat. No. 7,777,463.

(60) Provisional application No. 60/650,717, filed on Feb. 7, 2005.

(51) Int. Cl.
*G05F 1/10* (2006.01)
*H02J 3/12* (2006.01)

(52) U.S. Cl. ........................... 323/234; 320/106

(58) Field of Classification Search .......... 323/234, 323/274, 275; 307/21, 22; 320/106
See application file for complete search history.

(56) References Cited

U.S. PATENT DOCUMENTS

| | | | |
|---|---|---|---|
| 5,298,346 A | 3/1994 | Gyenes | |
| 5,684,382 A | 11/1997 | Fritz et al. | |
| 6,137,279 A * | 10/2000 | Ifesinachukwa et al. | 323/317 |
| 6,175,211 B1 | 1/2001 | Brotto | |
| 6,469,478 B1 | 10/2002 | Curtin | |
| 6,630,817 B1 | 10/2003 | Kison et al. | |
| 6,727,680 B2 | 4/2004 | Hoffman | |
| 6,809,649 B1 | 10/2004 | Wendelrup et al. | |
| 6,822,426 B1 | 11/2004 | Todd | |
| 2001/0017535 A1 | 8/2001 | Inaba et al. | |
| 2002/0125865 A1 | 9/2002 | Buchanan | |
| 2003/0025401 A1 | 2/2003 | Popescu-Stanesti et al. | |
| 2003/0159073 A1 | 8/2003 | Breen et al. | |
| 2004/0184289 A1* | 9/2004 | Vinciarelli | 363/15 |
| 2005/0138437 A1 | 6/2005 | Allen et al. | |
| 2005/0162020 A1* | 7/2005 | Lanni | 307/121 |
| 2006/0033473 A1* | 2/2006 | Stanzel et al. | 320/128 |

OTHER PUBLICATIONS

European Office Action dated Apr. 25, 2007, from related European Application No. 05011428.9-2206.
English translation of Taiwan Office Action from related Taiwan application 95101940.
European Office Action dated Dec. 8, 2008 issued in European Patent Application No. 05011428.9-2206.
English translation of Chinese Office Action issued in related Chinese Patent Application No. 2006100016344.
European Search Report dated May 11, 2006 in related European Patent Application No. 05011428.9-2224.

* cited by examiner

*Primary Examiner* — Arun Williams
(74) *Attorney, Agent, or Firm* — Grossman, Tucker, Perreault & Pfleger, PLLC (57) ABSTRACT

A method includes coupling a variable output DC power source to power control circuitry, and detecting a type of the variable output DC power source in response to the coupling operation. In one embodiment, the detecting operation may include sending an interrogation signal from the power control circuitry to the variable output DC power source, and evaluating a response to the interrogation signal to determine the type of said variable output DC power source. Power control circuitry may include source type recognition circuitry configured to detect a type of a variable output DC power source in response to a coupling of the variable output DC power source to the power control circuitry.

36 Claims, 4 Drawing Sheets

SYSTEM, METHOD AND APPARATUS TO AUTOMATICALLY DETECT A TYPE OF A VARIABLE OUTPUT DC POWER SOURCE

CROSS REFERENCE TO RELATED APPLICATIONS

This application is a continuation application of U.S. Non-provisional application Ser. No. 11/113,532filed Apr. 25, 2005, now U.S. Pat. No. 7,777,463, and claims the benefit of the filing date of U.S. Provisional Application Ser. No. 60/650,717, filed Feb. 7, 2005, the teachings all of which are incorporated herein by reference.

FIELD

This disclosure relates to variable output direct current (DC) power sources, and, in particular, to power control circuitry that can automatically detect a type of a variable output DC power source.

BACKGROUND

A variety of electronic devices such as cell phones, laptop computers, and personal digital assistants to name only a few, may be powered by one or more variable output DC power sources. A variable output DC power source may accept an unregulated input voltage and provide a variable output DC voltage and output current to a load. The unregulated input voltage may be an alternating current (AC) or DC input voltage.

There are many different classes of variable output DC power sources that may be defined by parameters including, but not limited to, input voltage range, maximum output voltage, and maximum output current. Within each class, there may be differing types of variable output DC power sources. Each type may be defined by additional parameters including, but not limited to, maximum output power rating, load regulation, line regulation, and over voltage/current protection features. In a conventional arrangement, each type of variable output DC power source may be designed to couple to particular power control circuitry to control operations thereof. This conventional arrangement decreases design flexibility and increases costs as each variable output DC power source requires particular power control circuitry.

Accordingly, there is a need in the art for power control circuitry that can be utilized with differing types of variable output DC power sources by detecting the type of variable output DC source coupled to it.

BRIEF SUMMARY OF THE INVENTION

According to one aspect of the invention, there is provided a method. The method may include coupling a variable output DC power source to power control circuitry, and detecting a type of the variable output DC power source in response to the coupling operation.

According to another aspect of the invention, there is provided a system. The system may include a variable output DC power source and power control circuitry. The power control circuitry may be configured to detect a type of the variable output DC power source in response to a coupling of the variable output DC power source to the power control circuitry.

According to yet another aspect of the invention there is provided power control circuitry. The power control circuitry may include source type recognition circuitry configured to detect a type of a variable output DC power source in response to a coupling of the variable output DC power source to the power control circuitry.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
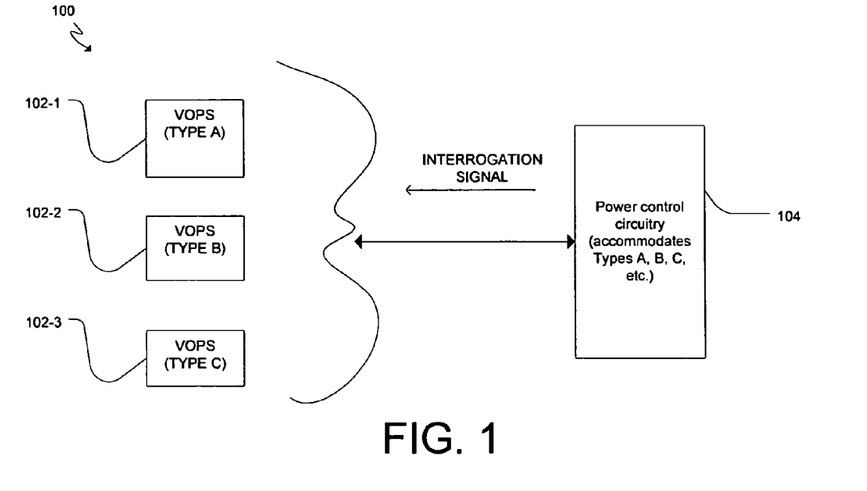
FIG. 1 is a block diagram of differing types of variable output DC power sources that may be coupled to the power control circuitry consistent with an embodiment.

FIG. 1 illustrates a system 100 including a plurality of variable output DC power sources 102-1, 102-2, and 102-3 and power control circuitry 104 consistent with embodiments herein. As used herein, "circuitry" may comprise, for example, singly or in any combination, hardwired circuitry, programmable circuitry, state machine circuitry, and/or firmware that stores instructions executed by programmable circuitry. Each variable output DC power source (VOPS) 102-1, 102-2, and 102-3 may be in the same class of variable output DC power sources. A class may be defined by parameters including, but not limited to, input voltage range, maximum output voltage, and maximum output current. A class of variable output DC power sources may be physically capable of being coupled to the power control circuitry 104. Within each class, there may be differing types of variable output DC power sources. Each type (e.g., generically labeled Types A, B, and C) may be defined by additional parameters including, but not limited to, a maximum output power rating, load regulation, line regulation, and over voltage/current protection features.

Each VOPS 102-1, 102-2, and 102-3 may be individually coupled to the power control circuitry 104. The power control circuitry may be configured to detect which type of VOPS has been coupled to it. For example, if the VOPS 102-1 is coupled to the power control circuitry 104, the power control circuitry 104 may detect that a "Type A" VOPS is coupled to it. The power control circuitry 104 may then be able to control the VOPS 102-1 with particulars associated with a "Type A" VOPS. Similarly, if the VOPS 102-2 is coupled to the power control circuitry 104, the power control circuitry may detect that a "Type B" VOPS is coupled to it. The power control circuitry 104 may then be able to control the VOPS 102-2 with particulars associated with a "Type B" VOPS. Only three types of variable output DC power sources are illustrated in FIG. 1 for clarity of illustration. However, the power control circuitry 104 may be configured to detect any plurality of differing types of variable output DC power sources in a variety of different classes of variable output DC power sources.

To detect which type of VOPS is coupled to the power control circuitry 104, the power control circuitry 104 may send an interrogation signal to the VOPS after the coupling of the VOPS to the power control circuitry 104. The power control circuitry 104 may then evaluate a response to the interrogation signal to determine the type of VOPS. The interrogation signal may be a current signal or a voltage signal as further detailed herein relative to different embodiments.

Figure 2:
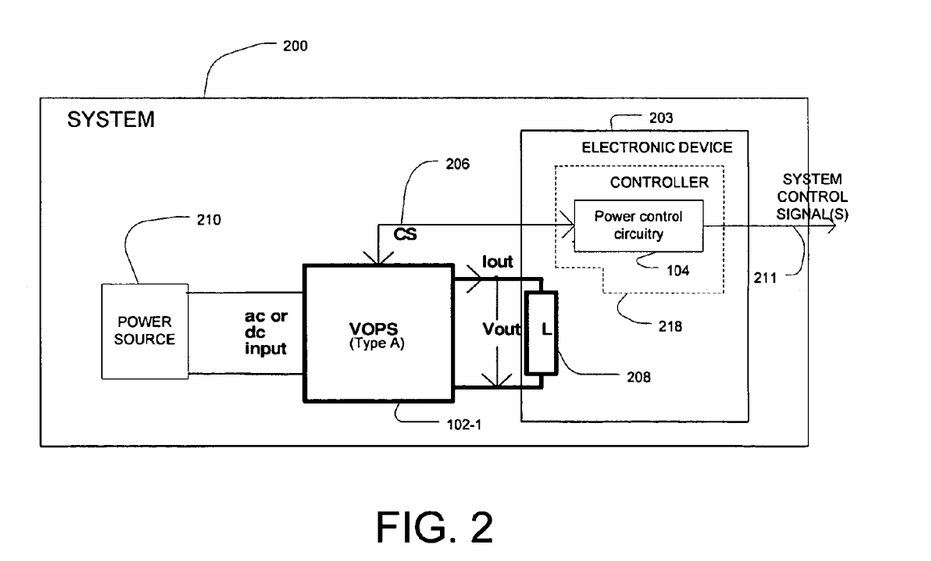
FIG. 2 is a diagram of a system including a variable output DC power source and the power control circuitry of FIG. 1.

FIG. 2 illustrates a system 200 having the VOPS 102-1 (Type A) and the power control circuitry 104 of FIG. 1 coupled together. The system 200 may include a power source 210, the VOPS 102-1, and an electronic device 203. The electronic device 203 may include a load 208 and the power control circuitry 104. The power control circuitry 104 may be stand alone circuitry or may be part of a more complex controller 218. The power source 210 may be capable of supplying an AC or DC input voltage to the VOPS 102-1. The VOPS 102-1 may accept input power from the power source 210 and provide power to the load 208. The electronic device 203 may include, but not be limited to, a server computer, a desk top computer, a laptop computer, a cell phone, a personal digital assistant, a digital camera, etc.

The load 208 may represent the load of the entire electronic device 203 or a part of the electronic device 203. The load 208 may also represent a stand alone load which is not part of the electronic device 203. FIG. 2 illustrates only one of many possible topologies or systems since, for example, in other instances the VOPS 102-1 may be part of the electronic device 203. In one example, the power source 210 may be a common 120 volt/60 Hertz AC power line, the VOPS 102-1 may be a variable output ACDC adapter, the electronic device 203 may be a laptop computer, and the load 208 may represent the entire load of the laptop computer.

In operation, once the VOPS 102-1 is coupled to the power control circuitry 104, the power control circuitry 104 may detect that a "Type A" VOPS is coupled to it and may then be able to control the VOPS 102-1 with particulars associated with a "Type A" VOPS via one or more control signals sent via the control path 206. The power control circuitry 104 may also send other system control signals via path 211 to the rest of the system. In one embodiment, to detect which type of VOPS is coupled to it, the power control circuitry 104 may send an interrogation signal to the VOPS 102-1 via the control path 206 and may evaluate a response to the interrogation signal to ascertain the VOPS type. The response may be received by the power control circuitry 104 via the same control path 206. The VOPS 102-1 may accept the unregulated input voltage and provide a variable output DC voltage (Vout) and output current (Iout) to the load 208. The VOPS 102-1 may provide varying Vout and Iout levels in response to one or more control signals (CS) provided by the power control circuitry 104 via the control path 206. The power control circuitry 104 may also monitor conditions, e.g., Iout and Vout, of the VOPS 102-1 and provide the one or more control signal in response to the monitored conditions and the type of VOPS.

Figure 3A:
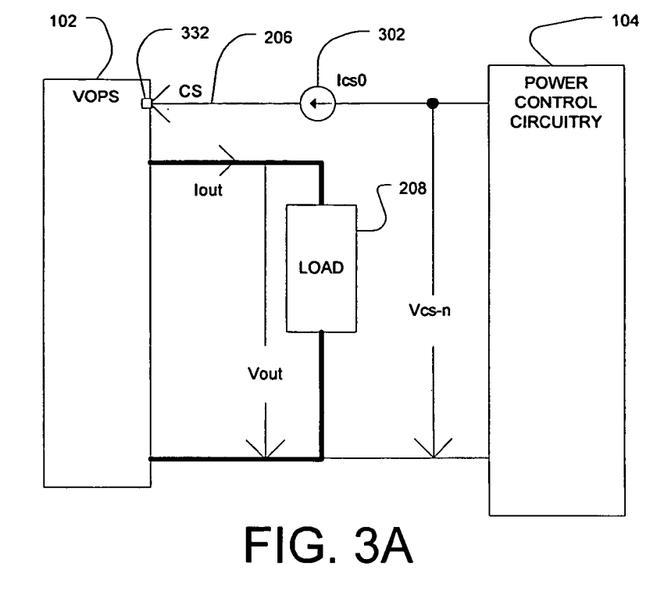
FIG. 3A is a diagram of an embodiment where an interrogation signal sent by the power control circuitry to the variable output DC power source is a current signal.
Figure 3B:
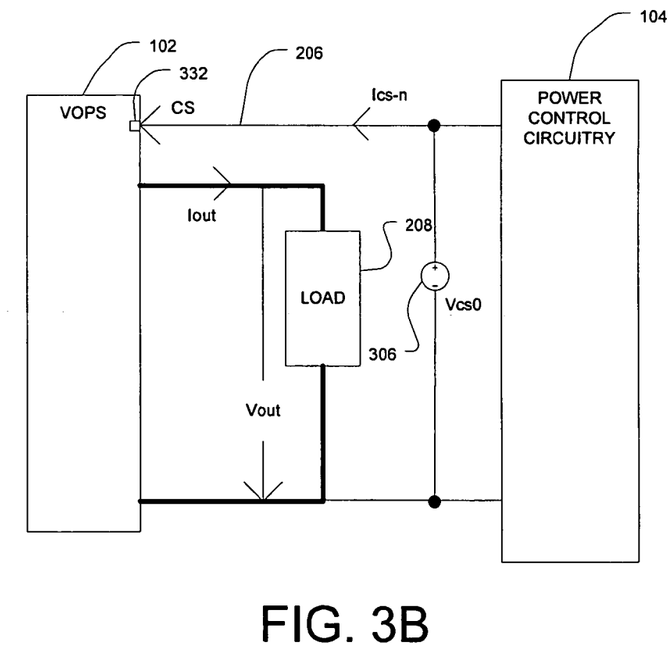
FIG. 3B is a diagram of an embodiment where an interrogation signal sent by the power control circuitry to the variable output DC power source is a voltage signal.

FIG. 3A illustrates an embodiment where the interrogation signal sent by the power control circuitry 104 to the VOPS 102 may be a current signal and FIG. 3B illustrates another embodiment where the interrogation signal may be a voltage signal. In each instance, the current signal and the voltage signal may be either an analog or digital signal depending on the control algorithm utilized by the power control circuitry 104.

In the embodiment of FIG. 3A, when the VOPS 102 is first coupled to the power control circuitry 104, a power-on sequence may ensue. During the power-on sequence, a particular current signal 302 IcsO may be sent to the VOPS 102. The VOPS 102 may have a particular impedance value at its control terminal 332 coupled to the control path 206. Each type of VOPS may have an associated impedance different from other types of variable output DC power sources within that particular class. Consequently, when the particular current signal Ics0 is sent to the VOPS 102, a corresponding plurality of different voltage levels may appear at the control terminal 332 of the VOPS 102. A voltage level of the plurality of voltage levels Vcs-n may be associated with a particular type of VOPS.

In the embodiment of FIG. 3B, a particular voltage signal VscO 306 may be sent to the VOPS 102. In response, a plurality of current levels Ics-n may flow from the power control circuitry 104 to the VOPS 102 due to the different impedance levels for each type of VOPS as seen at the control terminal 332. In the embodiments of FIG. 3A and 3B, the power control circuitry 104 may be configured to detect which voltage/current level of the Vcs-n/Ics-n levels is present. In response to the detected level, the power control circuitry 104 may then be configured to determine which type of VOPS is present. The information about the type of VOPS may be memorized (latched) by the power control circuitry 104 until the next VOPS insertion sequence.

Figure 4:
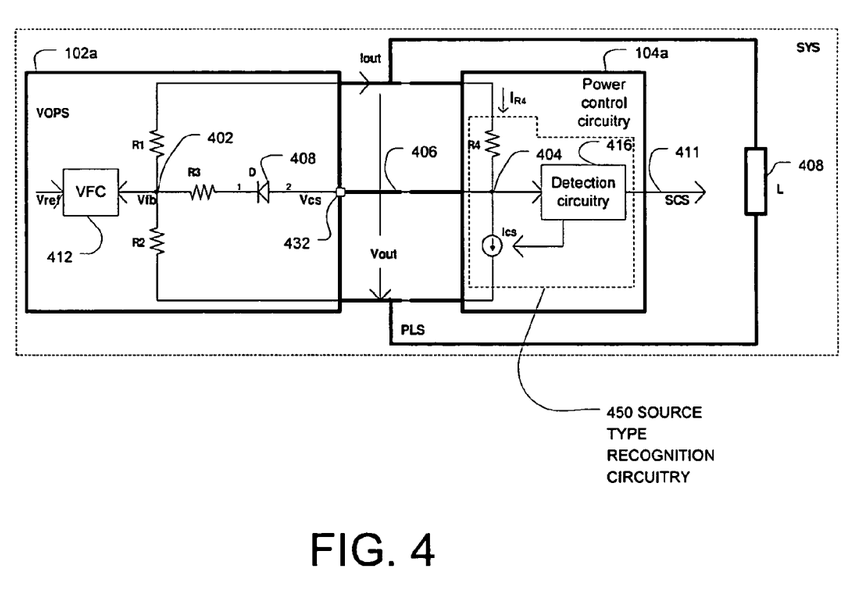
FIG. 4 is a diagram of an embodiment consistent with FIGS. 1, 2, and 3A.

FIG. 4 illustrates another embodiment of a system 400 consistent with the present invention. The system 400 may include an embodiment of a VOPS 102a and power control circuitry 104a consistent with the embodiments of FIGS. 1, 2, and 3A. For clarity, only those components of the VOPS 102a and the power control circuitry 104a related to detection of a particular type of VOPS are illustrated. The VOPS 102a and power control circuitry 104a may therefore include a host of other circuitry not illustrated. The power control circuitry 104a may include source type recognition circuitry 450. In general, the interrogation signal sent by the source type recognition circuitry 450 may be a current signal. The source type recognition circuitry 450 may then evaluate a response to the current signal, e.g., a voltage level, to determine the type of VOPS 102a.

The VOPS 102a may include a first resistor R1, a second resistor R2, and a third resistor R3 coupled to a feedback node 402. The VOPS 102a may be a variable output ACDC adapter in one embodiment. The VOPS 102a may also include voltage feedback circuitry (VFC) 412 which may also be coupled to the same feedback node 402. The voltage feedback circuitry 412 may receive an internal reference voltage Vref and a signal representative of an output voltage Vout of the VOPS 102a to control the output voltage Vout of the VOPS 102a The VOPS 102a may further include a diode 408 coupled to the control path 406 to prevent reverse current flowing from the VOPS 102 to the power control circuitry 104a. The VOPS 102a may also include a control terminal 432 coupled to the control path 406.

The power control circuitry 104a may include the source type recognition circuitry 450. The source type recognition circuitry 450 may include a fourth resistor R4 and detection circuitry 416. The fourth resistor R4 and the detection circuitry 416 may all be coupled to a control node 404. The control path 406 may couple the control terminal 432 of the VOPS 102a to the control node 404. The detection circuitry 416 may be configured to analyze a voltage level on the control terminal 432 and determine the type of the VOPS 102a in response to the voltage level.

The value of the current extracted from the control node 404 may be set to vary from 0 to full current delivered through the fourth resistor R4. When all the current through the fourth resistor R4 is diverted to ground (Ics=$I_{R4}$), the VOPS 102a, as controlled by the voltage feedback circuitry 412, will deliver the maximum output voltage given by equation (1).

$$Voutmax=(1+R1/R2)*Vref \qquad (1)$$

In equation (1), Voutmax is the maximum output voltage of the VOPS 102a, R1 is a resistance value of the first resistor R1, R2 is a resistance value of the second resistor R2, and Vref is the internal reference voltage provided to the voltage feedback circuitry 412.

When none of the current provided through the fourth resistor R4 is diverted to ground ($I_{CS}$=0), the first resistor R1 and the sum of the third and the fourth resistor (R3+R4) may be considered to be coupled in parallel. In this instance, neglecting the voltage drop on the diode 408, the VOPS 102a will deliver a minimum output voltage given by equation (2).

$$Voutmin=(1+R1(R3+R4)/R2(R1+R3+R4))*Vref \qquad (2)$$

In equation (2), Voutmin is the minimum output voltage of the VOPS 102a, R1 is a resistance value of the first resistor R1, R2 is a resistance value of the second resistor R2, R3 is a resistance value of the third resistor R3, R4 is a resistance value of the fourth resistor R4, and Vref is the internal reference voltage provided to the voltage feedback circuitry 412.

The potential on the control terminal Vcs 432 may be approximated by equation (3).

$$V_{CS}=(R3/R3+R4)*(Voutmin-Vref) \qquad (3)$$

In equation (3), $V_{CS}$ is the potential at the control terminal 432, R3 is the resistance value of the third resistor R3, R4 is the resistance value of the fourth resistor R4, Voutmin is the minimum output voltage of the VOPS 102a, and Vref is the internal reference voltage provided to the voltage feedback circuitry 412.

As an example, consider a number of differing types of variable output DC power sources belonging to the same class. The class may have the same internal reference voltage Vref and be targeted for the same Voutmax and Voutmin values. Assume there are three types of variable output DC power sources within this class that may be defined by additional parameters including, but not limited to, maximum output power rating, load regulation, line regulation, and over voltage/current protection features. Since the maximum output voltage Voutmax as defined in equation (1) depends only the R1/R2 ratio if Vref is the same, each of the three types of variable output DC power sources may be designed with a different pair of first and second resistors R1 and R2. That is, the first type of VOPS may be designed with a first and second resistor R1a, R2a, the second type of VOPS may be designed with a first and second resistor R1b, R2b, and the third type of VOPS may be designed with a first and second resistor R1c, R2c provided that equation (4) is met.

$$R1a/R2a=R1b/R2b=R1c/R2c \qquad (4)$$

If the first and second resistor values for each of the three types (R1a, R1b) (R1b, R2b) (R1c, R2c) comply with equation (4), and Vref is the same for each type, then the maximum output voltage Voutmax as detailed in equation (1) is still the same for each type.

In order to also maintain the same minimum output voltage Voutmin for the three types of variable output DC power sources as detailed in equation (2), any number of sets each consisting of three correlated values of the sum S=R3+R4, namely Sa=R3a+R4, Sb=R3b+R4, Sc=R3c+R4a, may be computed provided that the following relations of equations (5) and (6) are met.

$$Sa>R4, Sb>R4, Sc>R4 \qquad (5)$$

$$Sa/R1a=Sb/R1b=Sc/R1c \qquad (6)$$

For example, in one approach to the sum S value computations, one may first arbitrarily choose a value Sx (among the three S sums) corresponding to the smallest value R1x of the three R1 resistors such that Sx>R4. For example, one may choose Sa where R1a is less than R1b and R1a is less than R1c such that Sa>R4 as required by equation (5). The remaining two correlated values, e.g., Sb and Sc, may then be computed using the relationship of equation (6). This approach would then ensure that the remaining requirements of equation (5) (namely that Sb>R4 and Sc>R4) would also be met.

Once a particular set of correlated values Sa, Sb, Sc has been chosen, there are three resulting values for the third resistor R3, or one for each type of VOPS as detailed by equations (7), (8), and (9) assuming the fourth resistor R4 external to the VOPS 102 has a fixed resistive value.

$$R3a=Sa-R4 \qquad (7)$$

$$R3b=Sb-R4 \qquad (8)$$

$$R3c=Sc-R4 \qquad (9)$$

Therefore, if the three variable output DC power source types are designed utilizing the above equations (1)-(9), then each type will have the same output voltage range while the potential on the control terminal Vcs 432 when the VOPS delivers Voutmin will have three different values $V_{CSa}$, $V_{CSb}$, $V_{CSc}$ that may be calculated by inserting the corresponding R3a, R3b and R3c values of equations (7), (8), and (9) for R3 of equation (3).

The detection circuitry 416 may be configured to analyze the voltage level at the control terminal 432 and compare the voltage level with particular values to determine the type of the VOPS in response to the particular voltage level. In one embodiment, the detection circuitry 416 may include a number of voltage comparators for comparing the detected voltage level with differing preset voltage threshold levels and logic circuitry to detect and memorize the VOPS type. This and other circuitry known to those skilled in the art may be utilized in the detection circuitry 416.

Accordingly, each of the three types of variable output DC power sources may have a different resistor sets for the first, second and third resistors (R1x, R2x, R3x) and consequently have a different impedance on the cs terminal 432 for each type. The power control circuitry 104a may then be configured to detect the VOPS type by applying a particular interrogation signal (when $I_{CS}$=0) and reading the resulting voltages $V_{CSa}$, $V_{CSb}$, $V_{CSc}$ on the cs terminal 432. The same path 406 may be utilized to retrieve information about the VOPS type ($V_{CSa}$, $V_{CSb}$, $V_{CSc}$) and to send the interrogation signal.

Figure 5:
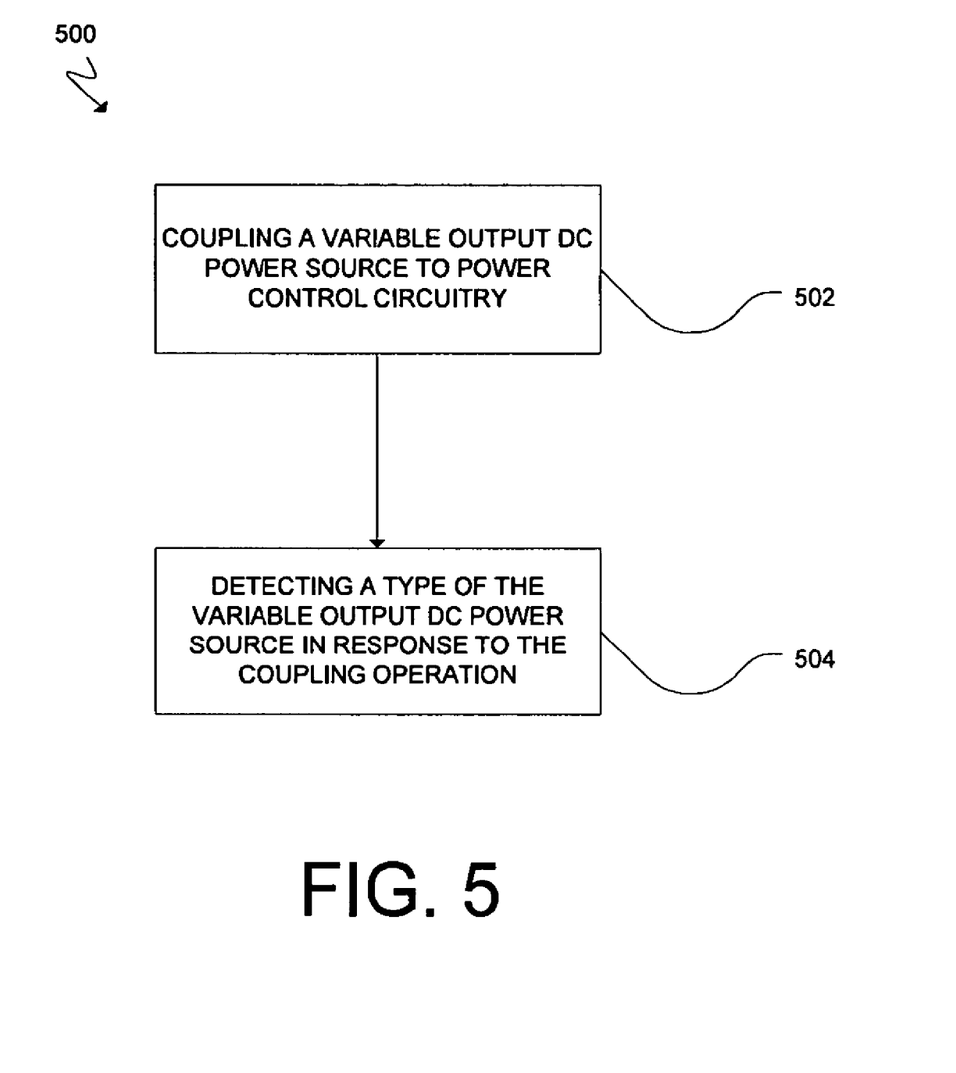
FIG. 5 is a flow chart illustrating operations that may be performed according to an embodiment.

FIG. 5 illustrates operations 500 according to an embodiment. Operation 502 may include coupling a variable output DC power source to power control circuitry. Operation 504 may include detecting a type of the variable output DC power source in response to the coupling operation. In one embodiment, the detecting operation may include sending an interrogation signal from the power control circuitry to the variable output DC power source, and evaluating a response to the interrogation signal to determine the type of said variable output DC power source.

Advantageously, power control circuitry may be utilized with different types of variable output DC power sources. After a variable output DC power source is coupled to the power control circuitry, the power control circuitry may be configured to detect which type is coupled to it. Therefore, one power control circuitry may be utilized with a number of different types of variable output DC power sources. The power control circuitry may automatically detect which type of variable output DC power source is coupled to it and may then control it accordingly. Hence, design flexibility may be increased and costs may be decreased.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
coupling a variable output DC power source to power control circuitry, wherein said variable output DC power source is a member of a class of variable output DC power sources and wherein said power control circuitry comprises source type recognition circuitry;
detecting a type of said variable output DC power source in response to said coupling operation using said source type recognition circuitry, said detecting including sending an interrogation signal from said power control circuitry to said variable output DC power source and evaluating a response to said interrogation signal; and
controlling said variable output DC power source in response to said detecting said type of said variable output DC power source using said power control circuitry, wherein said controlling is based at least in part on said detected type,
wherein said class comprises one or more types of variable output DC power sources;
wherein said interrogation signal comprises a current signal sent via a control path from said power control circuitry to said variable output DC power source, and wherein said response comprises a voltage level at a control terminal of said variable output DC power source coupled to said control path, said voltage level representative of said type of said variable output DC power source;
wherein said variable output DC power source comprises voltage feedback circuitry to receive a reference voltage and a signal representative of an output voltage of said variable output DC power source, said voltage feedback circuitry also coupled to a feedback node; and
wherein said power control circuitry comprises a control node coupled to said control path, said power control circuitry configured to analyze said voltage level at said control terminal and determine said type of said variable output DC power source in response to said voltage level.

2. The method of claim 1, wherein said class is defined by at least one parameter selected from the group comprising input voltage range, maximum output voltage range and maximum output current.

3. The method of claim 1, wherein said type is defined by at least one parameter selected from the group comprising maximum output power rating, load regulation, line regulation and over voltage/current protection.

4. The method of claim 1, wherein said interrogation signal comprises a current signal and said response to said interrogation signal comprises a voltage level.

5. The method of claim 1, further comprising:
receiving an internal reference voltage Vref and a signal representative of an output voltage Vout of said variable output DC power source at feedback circuitry coupled to a feedback node, wherein said variable output DC power source comprises said feedback circuitry, said feedback node and a first resistor, a second resistor and a third resistor coupled to said feedback node, wherein R1 is a resistance value of said first resistor, R2 is a resistance value of said second resistor and R3 is a resistance value of said third resistor; and
controlling said variable output DC power source to deliver an output voltage between a maximum output voltage Voutmax, and a minimum output voltage Voutmin, using said source type recognition circuitry wherein said source type recognition circuitry comprises a fourth resistor and detection circuitry coupled to a control node, wherein R4 is a resistance value of said fourth resistor, Voutmax=(1+R1/R2)*Vref and Voutmin=(1+R1(R3+R4)/R2(R1+R3+R4))*Vref.

6. The method of claim 5 wherein said variable output DC power source is configured to deliver Voutmax when all of a current through said fourth resistor is diverted to ground by said detection circuitry and Voutmin when none of a current through said fourth resistor is diverted to ground by said detection circuitry.

7. The method of claim 5 wherein a ratio of said resistance value of said first resistor and said resistance value of said second resistor for each variable output DC power source in the class of variable output DC power sources is the same, corresponding to a same maximum output voltage for a same Vref.

8. The method of claim 5 wherein a ratio (R3+R4)/R1 for each variable output DC power source in the class of variable output DC power sources is the same.

9. The method of claim 5 wherein said interrogation signal comprises a current signal sent via a control path from said power control circuitry to said variable output DC power source, and wherein said response comprises a voltage level at a control terminal of said variable output DC power source coupled to said control path, said voltage level representative of said type of said variable output DC power source.

10. A system comprising:
a variable output DC power source, wherein said variable output DC power source is a member of a class of variable output DC power sources; and
power control circuitry, wherein said power control circuitry comprises source type recognition circuitry configured to detect a type of said variable output DC power source in response to a coupling of said variable output DC power source to said power control circuitry, said source type recognition circuitry configured to detect said type by sending an interrogation signal from said power control circuitry to said variable output DC power source and evaluating a response to said interrogation signal, and said power control circuitry configured to control said variable output DC power source in response to said detecting said type of said variable output DC power source based at least in part on said detected type;
wherein said interrogation signal comprises a current signal sent via a control path from said power control circuitry to said variable output DC power source, and wherein said response comprises a voltage level at a control terminal of said variable output DC power source coupled to said control path, said voltage level representative of said type of said variable output DC power source;

wherein said variable output DC power source comprises voltage feedback circuitry to receive a reference voltage and a signal representative of an output voltage of said variable output DC power source, said voltage feedback circuitry also coupled to a feedback node; and wherein said power control circuitry comprises a control node coupled to said control path, said power control circuitry configured to analyze said voltage level at said control terminal and determine said type of said variable output DC power source in response to said voltage level; and wherein said class comprises one or more types of variable output DC power sources.

11. The system of claim 10, wherein said class is defined by at least one parameter selected from the group comprising input voltage range, maximum output voltage range and maximum output current.

12. The system of claim 10, wherein said type is defined by at least one parameter selected from the group comprising maximum output power rating, load regulation, line regulation and over voltage/current protection.

13. The system of claim 10, wherein said interrogation signal comprises a current signal and said response to said interrogation signal comprises a voltage level.

14. The system of claim 10, wherein said power control circuitry is further configured to:

receive an internal reference voltage Vref and a signal representative of an output voltage Vout of said variable output DC power source at feedback circuitry coupled to a feedback node, wherein said variable output DC power source comprises said feedback circuitry, said feedback node and a first resistor, a second resistor and a third resistor coupled to said feedback node, wherein R1 is a resistance value of said first resistor, R2 is a resistance value of said second resistor and R3 is a resistance value of said third resistor; and control said variable output DC power source to deliver an output voltage between a maximum output voltage Voutmax, and a minimum output voltage Voutmin, using said source type recognition circuitry wherein said source type recognition circuitry comprises a fourth resistor and detection circuitry coupled to a control node, wherein R4 is a resistance value of said fourth resistor, Voutmax=(1+R1/R2)*Vref and Voutmin=(1+R1(R3+R4)/R2(R1+R3+R4))*Vref.

15. The system of claim 14 wherein said variable output DC power source is configured to deliver Voutmax when all of a current through said fourth resistor is diverted to ground by said detection circuitry and Voutmin when none of a current through said fourth resistor is diverted to ground by said detection circuitry.

16. The system of claim 14 wherein a ratio of said resistance value of said first resistor and said resistance value of said second resistor for each variable output DC power source in the class of variable output DC power sources is the same, corresponding to a same maximum output voltage for a same Vref.

17. The system of claim 14 wherein a ratio (R3+R4)/R1 for each variable output DC power source in the class of variable output DC power sources is the same.

18. The system of claim 14 wherein said interrogation signal comprises a current signal sent via a control path from said power control circuitry to said variable output DC power source, and wherein said response comprises a voltage level at a control terminal of said variable output DC power source coupled to said control path, said voltage level representative of said type of said variable output DC power source.

19. A method comprising:

coupling a variable output DC power source to power control circuitry, wherein said variable output DC power source is a member of a class of variable output DC power sources and wherein said power control circuitry comprises source type recognition circuitry;

detecting a type of said variable output DC power source in response to said coupling operation using said source type recognition circuitry, said detecting including sending an interrogation signal from said power control circuitry to said variable output DC power source and evaluating a response to said interrogation signal; and controlling said variable output DC power source in response to said detecting said type of said variable output DC power source using said power control circuitry, wherein said controlling is based at least in part on said detected type;

receiving an internal reference voltage Vref and a signal representative of an output voltage Vout of said variable output DC power source at feedback circuitry coupled to a feedback node, wherein said variable output DC power source comprises said feedback circuitry, said feedback node and a first resistor, a second resistor and a third resistor coupled to said feedback node, wherein R1 is a resistance value of said first resistor, R2 is a resistance value of said second resistor and R3 is a resistance value of said third resistor; and controlling said variable output DC power source to deliver an output voltage between a maximum output voltage Voutmax, and a minimum output voltage Voutmin, using said source type recognition circuitry wherein said source type recognition circuitry comprises a fourth resistor and detection circuitry coupled to a control node, wherein R4 is a resistance value of said fourth resistor, Voutmax=(1+R1/R2)*Vref and Voutmin=(1+R1(R3+R4)/R2(R1+R3+R4))*Vref;

wherein said class comprises one or more types of variable output DC power sources.

20. The method of claim 19, wherein said class is defined by at least one parameter selected from the group comprising input voltage range, maximum output voltage range and maximum output current.

21. The method of claim 19, wherein said type is defined by at least one parameter selected from the group comprising maximum output power rating, load regulation, line regulation and over voltage/current protection.

22. The method of claim 19, wherein said interrogation signal comprises a current signal sent via a control path from said power control circuitry to said variable output DC power source, and wherein said response comprises a voltage level at a control terminal of said variable output DC power source coupled to said control path, said voltage level representative of said type of said variable output DC power source, wherein said variable output DC power source comprises voltage feedback circuitry to receive a reference voltage and a signal representative of an output voltage of said variable output DC power source, said voltage feedback circuitry also coupled to a feedback node; and wherein said power control circuitry comprises a control node coupled to said control path, said power control circuitry configured to analyze said voltage level at said control terminal and determine said type of said variable output DC power source in response to said voltage level.

23. The method of claim 19, wherein said interrogation signal comprises a current signal and said response to said interrogation signal comprises a voltage level.

24. The method of claim 19, wherein said variable output DC power source is configured to deliver Voutmax when all of a current through said fourth resistor is diverted to ground by said detection circuitry and Voutmin when none of a current through said fourth resistor is diverted to ground by said detection circuitry.

25. The method of claim 19, wherein a ratio of said resistance value of said first resistor and said resistance value of said second resistor for each variable output DC power source in the class of variable output DC power sources is the same, corresponding to a same maximum output voltage for a same Vref.

26. The method of claim 19, wherein a ratio (R3+R4)/R1 for each variable output DC power source in the class of variable output DC power sources is the same.

27. The method of claim 19, wherein said interrogation signal comprises a current signal sent via a control path from said power control circuitry to said variable output DC power source, and wherein said response comprises a voltage level at a control terminal of said variable output DC power source coupled to said control path, said voltage level representative of said type of said variable output DC power source.

28. A system comprising:
  a variable output DC power source, wherein said variable output DC power source is a member of a class of variable output DC power sources; and
  power control circuitry, wherein said power control circuitry comprises source type recognition circuitry configured to:
    detect a type of said variable output DC power source in response to a coupling of said variable output DC power source to said power control circuitry, said source type recognition circuitry configured to detect said type by sending an interrogation signal from said power control circuitry to said variable output DC power source and evaluating a response to said interrogation signal;
    control said variable output DC power source in response to said detecting said type of said variable output DC power source based at least in part on said detected type;
    receive an internal reference voltage Vref and a signal representative of an output voltage Vout of said variable output DC power source at feedback circuitry coupled to a feedback node, wherein said variable output DC power source comprises said feedback circuitry, said feedback node and a first resistor, a second resistor and a third resistor coupled to said feedback node, wherein R1 is a resistance value of said first resistor, R2 is a resistance value of said second resistor and R3 is a resistance value of said third resistor; and
    control said variable output DC power source to deliver an output voltage between a maximum output voltage Voutmax, and a minimum output voltage Voutmin, using said source type recognition circuitry wherein said source type recognition circuitry comprises a fourth resistor and detection circuitry coupled to a control node, wherein R4 is a resistance value of said fourth resistor, Voutmax=(1+R1/R2)*Vref and Voutmin=(1+R1(R3+R4)/R2(R1+R3+R4))*Vref;
    wherein said class comprises one or more types of variable output DC power sources.

29. The system of claim 28, wherein said class is defined by at least one parameter selected from the group comprising input voltage range, maximum output voltage range and maximum output current.

30. The system of claim 28, wherein said type is defined by at least one parameter selected from the group comprising maximum output power rating, load regulation, line regulation and over voltage/current protection.

31. The system of claim 28, wherein said interrogation signal comprises a current signal sent via a control path from said power control circuitry to said variable output DC power source, and wherein said response comprises a voltage level at a control terminal of said variable output DC power source coupled to said control path, said voltage level representative of said type of said variable output DC power source;
  wherein said variable output DC power source comprises voltage feedback circuitry to receive a reference voltage and a signal representative of an output voltage of said variable output DC power source, said voltage feedback circuitry also coupled to a feedback node; and
  wherein said power control circuitry comprises a control node coupled to said control path, said power control circuitry configured to analyze said voltage level at said control terminal and determine said type of said variable output DC power source in response to said voltage level.

32. The system of claim 28, wherein said interrogation signal comprises a current signal and said response to said interrogation signal comprises a voltage level.

33. The system of claim 28, wherein said variable output DC power source is configured to deliver Voutmax when all of a current through said fourth resistor is diverted to ground by said detection circuitry and Voutmin when none of a current through said fourth resistor is diverted to ground by said detection circuitry.

34. The system of claim 28, wherein a ratio of said resistance value of said first resistor and said resistance value of said second resistor for each variable output DC power source in the class of variable output DC power sources is the same, corresponding to a same maximum output voltage for a same Vref.

35. The system of claim 28, wherein a ratio (R3+R4)/R1 for each variable output DC power source in the class of variable output DC power sources is the same.

36. The system of claim 28, wherein said interrogation signal comprises a current signal sent via a control path from said power control circuitry to said variable output DC power source, and wherein said response comprises a voltage level at a control terminal of said variable output DC power source coupled to said control path, said voltage level representative of said type of said variable output DC power source.

* * * * *